US012717425B2

(12) United States Patent
Leung et al.

(10) Patent No.: US 12,717,425 B2
(45) Date of Patent: Aug. 25, 2026

(54) ORIENTATION AWARE SMART INPUT CORRECTION

(71) Applicant: Sony Interactive Entertainment Europe Limited, London (GB)

(72) Inventors: Jun Yen Leung, London (GB); Maurizio Cerrato, London (GB); Lawrence Martin Green, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 0 days.

(21) Appl. No.: 18/810,790

(22) Filed: Aug. 21, 2024

(65) Prior Publication Data

US 2025/0068262 A1 Feb. 27, 2025

(30) Foreign Application Priority Data

Aug. 22, 2023 (GB) ..................................... 2312819

(51) Int. Cl.
*G06F 3/0346* (2013.01)
*A63F 13/20* (2014.01)

(52) U.S. Cl.
CPC ............ *G06F 3/0346* (2013.01); *A63F 13/20* (2014.09)

(58) Field of Classification Search
CPC ........ G06F 3/0346; G06F 3/011; A63F 13/20; A63F 13/211; A63F 13/22; A63F 13/428; A63F 13/533; A63F 13/67; A63F 13/422
See application file for complete search history.

(56) References Cited

U.S. PATENT DOCUMENTS

2012/0154387 A1* 6/2012 Tsukahara ............. G06F 3/0346 345/419
2018/0338720 A1 11/2018 Gupta et al.
2019/0236344 A1 8/2019 Chen et al.
2023/0066821 A1* 3/2023 Ohashi ................... G06N 20/00

FOREIGN PATENT DOCUMENTS

WO WO-2021152723 A1 * 8/2021 .............. G01P 15/18

OTHER PUBLICATIONS

Combined Search and Examination Report issued in GB Appln. No. GB2312819.2 dated Feb. 20, 2024 (3 pages).
Extended European Search Report including Written Opinion for Application No. 24195572.3 dated Jan. 21, 2025. 11 pages.

* cited by examiner

*Primary Examiner* — David D Davis
(74) *Attorney, Agent, or Firm* — Fish & Richardson P.C.

(57) ABSTRACT

The present disclosure provides a computer implemented method of correcting a physical input to an input device of a controllable device. The method comprises: receiving a physical input from the input device; receiving orientation information from a gyroscope of the input device; providing the physical input and orientation information to a trained machine learning model, wherein the trained machine learning model is configured to output a corrected input based on the physical input and the orientation information; and receiving from the trained machine learning model, a corrected input corresponding to the physical input. Further, the present disclosure provides a computer-implemented method of training a machine learning model to correct a physical input to an input device of a controllable device.

20 Claims, 4 Drawing Sheets

| Intended Input | Orientation Information | Physical Input |
|---|---|---|
| ⇧ | $(x_1, y_1, z_1)$ | ⇧ |
| ⇨ | $(x_2, y_2, z_2)$ | ⇨ |
| ⇩ | $(x_3, y_3, z_3)$ | ⇩ |

Figure 7

ORIENTATION AWARE SMART INPUT CORRECTION

CROSS-REFERENCE TO RELATED APPLICATION

The present application claims priority from United Kingdom Patent Application No. GB2312819.2 filed Aug. 22, 2023, the disclosure of which is hereby incorporated herein by reference.

FIELD OF THE INVENTION

Disclosed herein is a method for correcting a physical input of an input device of a controllable device based on the physical input and orientation information of the input device by using a trained machine learning model. Also disclosed is a method of training a machine learning model to correct a physical input of an input device of a controllable device.

BACKGROUND

A user may interact with a controllable device, for example a video game device, using a physical input device, such as a controller. Operating an input device is conceptually simple. For example, the user may move the input device, or move a stick provided on the input device to interact with the video game device in a particular way. Using the stick of a game controller as an example, the user may move the stick of the controller in a particular direction to control movement of a character displayed on a screen.

However, input accuracy suffers when the controller is not being held exactly aligned with the user's body. For example, consider a user who is playing a game while lying down. This may result in the input device or controller being oriented in an unusual way compared to if the user was sitting up. If the user wants to control a character on screen to move forward, then they would instinctively press a stick on the controller in the forward direction relative to their body. However, for this user, "forward" relative to their body may not exactly be "forward" on the controller.

Existing controllable devices such as video game devices and systems do not consider the user's position as a cause of input inaccuracy and instead take the input as-is, effectively punishing the player for not using a particular posture or controller orientation.

A purpose of an input device such as a controller is to allow the user to express their will, rather than to overly restrict a user for wanting to take up a comfortable position. In addition, some users may not be able to orient themselves to what might be considered as the 'optimal' position due to limited physical abilities.

A need therefore exists to limit the loss of input accuracy caused by the user holding an input device in a comfortable orientation.

Modern input devices such as game controllers tend to include an orientation sensor, such as a gyroscope which detects the orientation of the controller. Control inaccuracy caused by sub-optimal controller orientation may itself be a function of the orientation.

A limited approach for reducing the effect of input accuracy could be to use a linear model to describe the relationship between orientation information and input accuracy. However, such an approach is clearly limited in that it is unlikely to practically correct the input inaccuracy on scenarios deviating from the linear model.

The need to reduce input inaccuracy caused by the input device or controller being in a sub-optimal orientation therefore remains a problem to be solved.

SUMMARY OF INVENTION

Aspects of the disclosure relate generally to correcting a physical input to a controllable device.

A first aspect of the invention provides a computer implemented method of correcting a physical input to an input device of a controllable device, the method comprising: receiving a physical input from the input device; receiving orientation information from a gyroscope of the input device; providing the physical input and orientation information to a trained machine learning model, wherein the trained machine learning model is configured to output a corrected input based on the physical input and the orientation information; and receiving from the trained machine learning model, a corrected input corresponding to the physical input.

In this way, orientation information of the input device is used with the physical input to compensate or correct for inaccurate input stemming from the position or orientation of the input device. By correcting the input in this way, that is, by being orientation-aware, a user is able to use the input device in a range of positions without being penalised for using a particular position. The user's experience is therefore improved because they have greater freedom to choose how they interact with the video game device.

In addition, by using a trained machine learning model, the method provides for intelligent and accurate correction of physical input inaccuracy. The trained machine learning model outperforms a linear model approach because it can process input device orientations that the model has not encountered before.

Further, users of the video game device are now able to use a range of orientations of the input device that were previously problematic due to the likelihood of making an input mistake. This provides the user with more options for gaming from a comfortable position. That is, since the orientation information of the input device is taken into account when correcting an inaccurate physical input, the user can game from any position without needing to worry about holding the input device in a particular orientation.

Additionally, in some advantageous examples, the trained machine learning model may be stored on the controllable device. In other words, the trained machine learning model is stored locally in memory of the controllable device.

Accordingly, input lag is reduced since a device performing the method is able to process the physical input and compute the corrected input without sending data to a remote location. Latency is therefore kept low, and the user can be provided with seamless correction of the inaccurate physical input.

Alternatively or additionally, in some examples, the trained machine learning model is stored on a remote server, the remote server being in communication with the controllable device.

By the remote sever being in communication with the controllable device, we intend to mean that a data connection, for example a two-way data connection, is provided between the controllable device and the remote server. If a high-speed data connection could be provided, such that noticeable input lag was not introduced, then storing the machine learning model on a remote server removes constraints arising from implementing a machine learning model on the video game device. Namely, power constraints, and processor constraints of the controllable device can be worked around by keeping the trained machine learning model in a resource rich environment, i.e. a remote server. It naturally follows that if the machine learning model is stored remotely, then the method may further involve transmitting data from the controllable device, and receiving the corrected input after calculation by the machine learning model at the remote server.

Further, storing the machine learning model on a remote server would allow legacy systems without sufficient local processing power to benefit from the orientation-aware correction. Moreover, the trained machine learning model may be a trained neural network, and the physical input and orientation information may be provided as input to an input layer of the trained neural network.

A trained neural network provides the benefits of a trained machine learning model. That is, the trained neural network provides for intelligent and accurate correction of input inaccuracy. The trained neural network outperforms a linear model approach because it can cope with a greater range of input device positions, including orientations that it has not encountered before.

In some advantageous implementations the input device is a video game device controller.

Further, in some examples, the physical input comprises moving a stick of the video game device controller.

In this way a common issue that arises from unusual controller positioning or orientation can be addressed. It is known that a stick of a video game controller can be rotated around a full circle. While this allows for more precise control of events in a video game, it also introduces room for error. For example, the user may intend to move the stick directly to the right, but because of their position, and the resulting orientation of the controller, they accidently move the stick right and forward. This kind of inaccurate input can negatively affect the gaming experience of the user. The present disclosure solves this issue by intelligently correcting the input before any adverse effects can occur, thereby improving the overall user experience.

Optionally, the method may comprise detecting that the physical input requires correction; and providing the physical input and orientation information to the trained machine learning model in response to the detecting.

The correction is therefore performed in circumstances where it is meaningful to perform a correction.

Optionally, the method may further comprise sending the corrected input to an application running on the controllable device. That is, a game being run on the video game device receives and acts on the corrected input.

A second aspect of the invention provides a computer implemented method of training a machine learning model to correct a physical input to an input device of a controllable device, the method comprising: providing a training dataset, the dataset comprising a plurality of training instances, each training instance comprising an intended input, a physical input and orientation information of the input device; and training the machine learning model based on the plurality of training instances to predict the intended input based on the physical input and the orientation information to provide a trained machine learning model.

In this way, a machine learning model is trained to provide accurate and orientation aware correction of inaccurate physical input. By using a machine learning model instead of other simple models, the model is equipped to handle new situations as they occur during everyday use of the controllable device.

In some advantageous examples the method further comprises: storing information associated with the trained machine learning model on the controllable device; and initialising an implementation of the trained machine learning model on the controllable device.

Accordingly, the controllable device is able to provide smart, orientation-aware correction of the physical input. The controllable device storing the learned weights is an improved controllable device since it provides additional functionality, as has been discussed above.

Advantageously, the method may further comprise: receiving data specific to a user of the controllable device via the input device, wherein the data comprises a physical input from the input device, orientation information of the input device and an intended input to the input device; and updating the information associated with the trained machine learning model based on the received data.

The trained machine learning model can therefore be fine-tuned by adjusting the information associated with the machine learning model based on user data. The trained machine learning model can therefore be improved to correct common mistakes that arise in input device orientations that a particular user regularly or occasionally uses.

In some examples, the intended input to the input device may be derived based on a manual correction of the physical input. For example, the input device could be a video game controller and the manual correction may comprise a rotational movement of a stick provided on the video game controller.

By manual correction, we intend to mean that the user realises during use of the controllable device that they are making a mistake, and reacts to correct their own mistake, for example by rotating a stick to bring the stick to the position that they originally intended.

This effectively allows for on-going fine-tuning of the machine learning model based on actual physical inputs provided by the user. The neural network model is therefore tailored to the needs of the specific user. This provides another layer of improvement to the user's overall experience.

In addition to, or alternatively, the intended input to the input device is derived based on a prompt displayed to the user.

In this way, the user intentionally interacts with the video gaming system to perform a fine-tuning adjustment of the machine learning model. This could be a fine-tuning application used when the user initially starts using the controllable device, or at a later time. Accordingly, the user is provided with another way to tailor the machine learning model to suit their particular needs.

The methods of fine-tuning discussed above can be combined to provide an effective method of fine-tuning the model. That is, the user can initially interact with a display to provide a first stage of fine-tuning, and then the system can continue with performing on-going fine-tuning in the background.

In some examples the updated information associated with the trained machine learning model is stored in a user profile of the user. Further, the user profile may be stored on the controllable device.

In this way, different users on the same device can each benefit from a tailored machine learning model for performing orientation-aware physical input correction. Further, the user profile could be stored remotely, that is, on a remote server, allowing the user to access their tailored machine learning model from different controllable devices.

Moreover, the provision of a dataset as set out above may involve displaying a prompt, wherein the prompt is the intended input, and in response to the prompt: receiving an orientation information of the input device from the input device; and receiving a physical input from the input device.

Accordingly, a specialised dataset is constructed for the purpose of training the machine learning model to correct a physical input to an input device of a controllable device.

In some advantageous examples, the machine learning model may be a neural network. Accordingly, the information associated with the trained machine learning model could be a value for each of the weights that connect nodes in adjacent layers of the neural network.

In addition, the input device may be a video game device controller.

Optionally, the physical input may be a stick input of the video game device controller.

As stated above, in this way a common issue that arises from unusual controller orientation can be solved. It is known that a stick of a video game controller can be rotated around a full circle. While this allows for more precise control of events in a video game, it also introduces room for error. For example, the user may intend to move the stick directly to the right, but because of their position, and the resulting position of the controller, they accidently moved the stick right and forward. This kind of inaccurate input can negatively affect the gaming experience of the user. The present disclosure tackles this issue by intelligently correcting the input before any adverse effects can occur, thereby improving the overall user experience.

In some examples, the controllable device comprises one of: a video game device; a remote controlled vehicle; or a medical device. The method described herein is widely applicable to many use-cases where an input device is used to control a controllable device. For example, the controllable device may be a video game device such as a video game console or a video game system. The remote controlled vehicle may be a toy or model remote control vehicle, but could also be a full-size remote control vehicle, for example a car. In terms of a medical device, the controllable device could be a device for conducting remote surgery. It will be appreciated that surgery requires precise movement of surgical tools. It is even more important to ensure that the user's physical input is properly corrected when the need arises, as mistakes during remote surgery could cause serious injury or death to a patient.

A third aspect of the invention provides a computer-readable storage medium comprising instructions, which when executed by a processor of a controllable device, cause the video game device to perform the method of the first aspect.

A fourth aspect of the invention provides a computer-readable storage medium comprising instructions, which when executed by a processor, cause the processor to perform the method according to the second aspect.

A fifth aspect of the invention provides a system configured to perform a method according to the first aspect.

A sixth aspect of the invention provides a device configured to perform a method according to the second aspect.

A further aspect of the disclosure provides a method for constructing a dataset for training a machine learning model to correct a physical input to an input device of a controllable device. The method may comprise: displaying a prompt, wherein the prompt is the intended input, and in response to the prompt: receiving an orientation information of the input device from the input device; and receiving a physical input from the input device.

BRIEF DESCRIPTION OF DRAWINGS

The invention will be described with reference to the Figures, in which:

FIG. 7 shows an example dataset for training instances.

DETAILED DESCRIPTION

The disclosure generally provides a method for correcting a physical input to a controllable device. The controllable device is any kind of device that can be controlled by receiving an input from an input device. However, for the sake of contextualising the invention, the disclosure below relates to video game devices. It would be understood that references below to video game devices are interchangeable with controllable device.

An important part of the user's experience with a video game device depends on how they interact with the device. That is, if an input device properly expresses the user's intentions, then the user will have a good experience. On the other hand, if the input device fails to properly express the user's intentions, then the user can become frustrated, thereby negatively impacting the user experience. Accordingly, the present disclosure provides methods for correcting a physical input to an input device of a video game device, so that the user's intended inputs are properly realised.

The present disclosure applies to all kinds of input devices. The disclosures herein will be illustrated primarily with reference to application in video game devices, such as a motion sensing controller, or a video game controller, it will be understood that the invention may be implemented in other controllers such as remote controlled vehicles, medical devices and the like. For ease of reference, below we refer to a video game controller or simply to a controller. However, it would be understood by a skilled person that a controller is interchangeable with another kind of input device that controls a video game device.

Errors in the physical input can arise when the controller is oriented in an unusual way. By unusual orientation, we intend to mean an orientation that is different to the orientation that the controller is intended to be used in. As an example, a controller may be intended to be used with its main control interface facing up.

Figure 1:
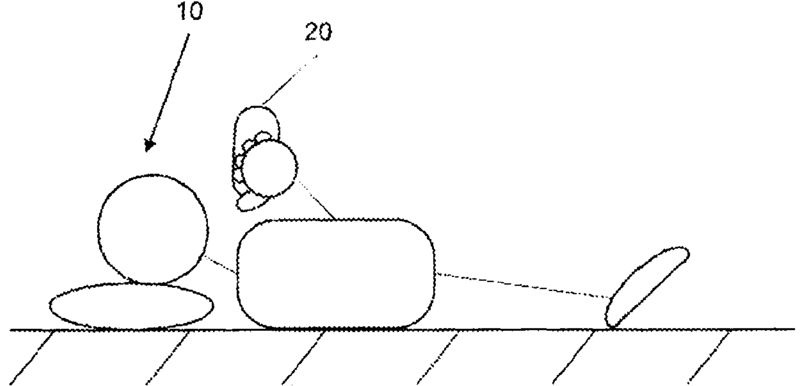
FIG. 1 shows a user lying down while holding an input device.

Referring to FIG. 1, a user 10 can be seen using a controller 20 while lying down. While lying down, the user 10 may hold the controller 20 with the buttons facing down, or they may hold the controller 20 so that they can see the buttons.

In another example, the user may be seated, but instead of holding the input device with the buttons facing up, they may have their arms hanging loosely, resulting in the buttons being oriented away from the user.

In any case, the errors that arise from the unusual orientation may be considered to be a function of the orientation itself.

Figure 2:
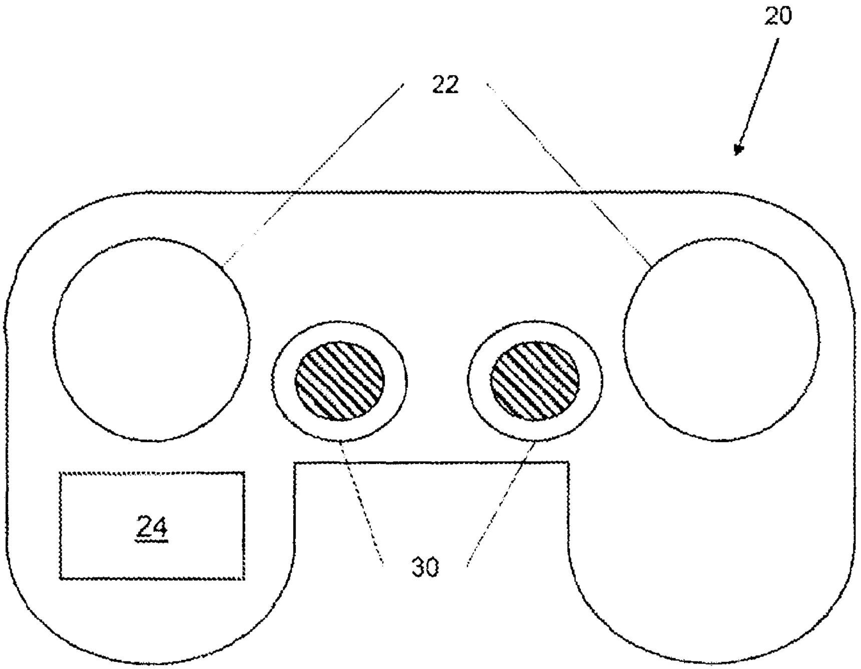
FIG. 2 shows an example video game controller.

An example controller 20 is shown in FIG. 2. It can be seen that the controller includes two sets of buttons 22 and two sticks or joysticks 30. The controller 20 further comprises an orientation sensor 24 such as a gyroscope. It would be understood that the controller 20 can include numerous other sensors such as a microphone, an optical sensor, and an accelerometer, as well as other components such as a battery, a charging port, a speaker, a light emitting device and a touch sensitive surface. The controller 20 may also comprise a wireless transceiver for transmitting signals to and receiving signals from a video game system. It is to be emphasised that the disclosure is not limited to the example controller 20. Rather, the concepts disclosed below can be applied to various kinds of input devices for video game devices. For example, another kind of input device may have one stick 30 or more than two sticks 30.

Figures 3, 4:
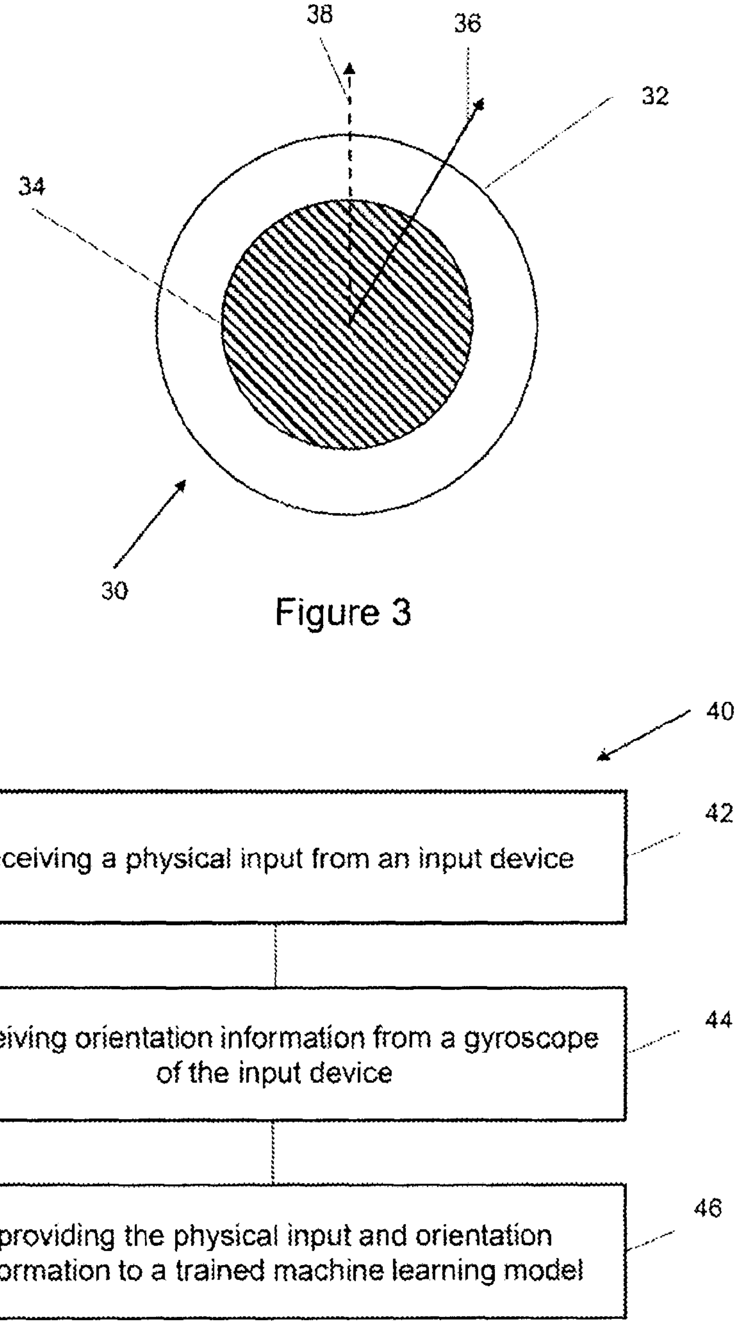
FIG. 3 shows a stick of a video game controller, and how the correct input may differ from the physical input.
FIG. 4 shows a method for correcting a physical input.

A particular kind of physical input error relates to a stick 30, also known as a joystick, of the controller 20. A top-down view of a stick 30 is shown in FIG. 3. The stick 30 comprises a base 32 and a raised member 34 connected to the base 32. In use, the base 32 of the stick 30 acts as a pivot, and the user 10 moves the raised member 34 about the pivot to interact with a video game device. The stick 30 can be moved in any direction as is conventionally known in the art.

During gameplay, the user 10 may intend to move the raised member 34 in a first direction 38. However, due to an unusual orientation of the controller 20, they inadvertently move the raised member 34 in a second direction 36 instead. This can negatively impact the gameplay experience of the user 10. Conventionally, the user 10 would be punished for making this kind of mistake. However, to improve the user's experience, the present disclosure describes how the actual physical input can be corrected based on the orientation of the controller.

FIG. 4 shows a flowchart of a computer-implemented method 40 for correcting a physical input to an input device. Specifically, the input device may be a controller of a video game device as discussed above. Further, the physical input may refer to movement of a stick of the controller, specifically a raised member of the stick, by the user. The method is typically performed by one or more processors or processor sets of a video game device.

In a first step 42, a physical input is received from the input device. By physical input, we intend to mean an actual input received by the video game device in response to a user's action on the input device.

At step 44, orientation information is received from an orientation sensor of the input device. The orientation sensor may be a gyroscope, or other inertial measurement unit (IMU).

At step 46, the physical input and the orientation information are provided to a trained machine learning model. Methods of training a machine learning model to correct a physical input will be discussed below. Further, the trained machine learning model is configured to output a corrected input based on the physical input and the orientation information. By corrected input, we intend to mean that that the machine learning model outputs an input that the user intended based on the orientation of the input device.

In examples, the input may be expressed a 1×4 vector containing pitch, yaw, roll and stick direction. That is, the orientation information may be expressed in terms on pitch, yaw and roll. Similarly, the physical input may be expressed as a stick direction.

Further, the output from the model may be an error associated with the physical input and orientation information. In these examples, the model may be trained to predict an error associated with the physical input based on the input orientation information and stick direction. The corrected input may then be derived by adding or subtracting the error from the physical input direction.

At step 48, a corrected input corresponding to the physical input is received from the trained machine learning model.

Accordingly, the present disclosure provides a smart orientation-aware method of correcting a physical input. The user can use the input device from a variety of positions that were not previously feasible due to the increased likelihood of the user making an error in the physical input. Now that the user is not worried about being penalised for taking a particular position, or for using the controller in a comfortable orientation, they would not think twice about using the input device in a way that suits them.

Further, by making use of a machine learning model that accounts for the orientation of the controller when determining the corrected input, the resulting corrected input is determined intelligently and accurately. Further, a machine learning model can process orientations that differ from previously seen orientations without difficulty. This is in stark contrast to a limited linear approach, where it would be impractical and unfeasible to determine a likely correction at every possible orientation.

In the examples discussed herein, the orientation information can be said to be associated with the physical input. For example, the orientation information may relate to the orientation of the input device at or around the time that the physical input was performed.

Further advantageous, optional implementations are now discussed.

An implementation of the trained machine learning model may be stored in a storage module of the video game device. This typically involves storing information associated with the machine learning model in the storage module. A processor can then implement the machine learning model. Storing an implementation of the machine learning model locally reduces latency and cuts down input lag since all processing is performed locally. Latency is kept low, and the user is provided with seamless correction of the inaccurate input. Where the input device comprises its own storage module, the implementation of the trained machine learning model can be stored on the on-board storage module.

The trained machine learning model may also be stored in a storage module of a remote server. The remote server may be in communication with the video game device via a data connection. For example, the Internet may be used to connect the remote server to the video game device. Other communication networks could feasibly be used. As the field of cloud computing continues to develop, the quality of data connections and the speeds that can be realised continue to grow. Accordingly, with the use of a suitable data connection, the video game device can exchange data with a trained machine learning model hosted on a remote server so that the server can perform the resource intensive parts of the process. That is, the remote server can perform the machine learning model processing.

This brings about multiple benefits. Firstly, resources on the video game device are saved, for example processor resources. Power consumption of the video game device is also reduced. This can help to reduce the computational burden on the video game device, which can help other applications on the video game device run smoothly, or at higher settings. Secondly, hosting the machine learning model remotely allows older video game devices to access the remote server and make use of the input correction techniques discussed above. Thirdly, the machine learning model can be maintained and updated centrally, instead of at a network edge. Maintenance of the machine learning model is therefore simplified.

Various machine learning models are known in the art and can be used to achieve the physical input correction described above. In particular, the machine learning model may be a neural network.

For completeness, the neural network may comprise an input layer, one or more hidden layers, and an output layer. Each layer comprises a number of nodes, and nodes in adjacent layers are connected by weights. Each node may be subject to an activation function which determines if a node is activated or not, depending on the value of the node. The output from activated nodes is used as an input to a node or nodes in the next layer of the neural network.

In some orientations, it may be determined that no correction is required because no errors are made. In other examples, physical input and orientation information may be provided to the machine learning model or input layer of the neural network in response to detecting that the physical input requires correction. Putting it another way, based on a range of acceptable deviation from the intended input, in some circumstances, no correction may be performed.

Figure 5:
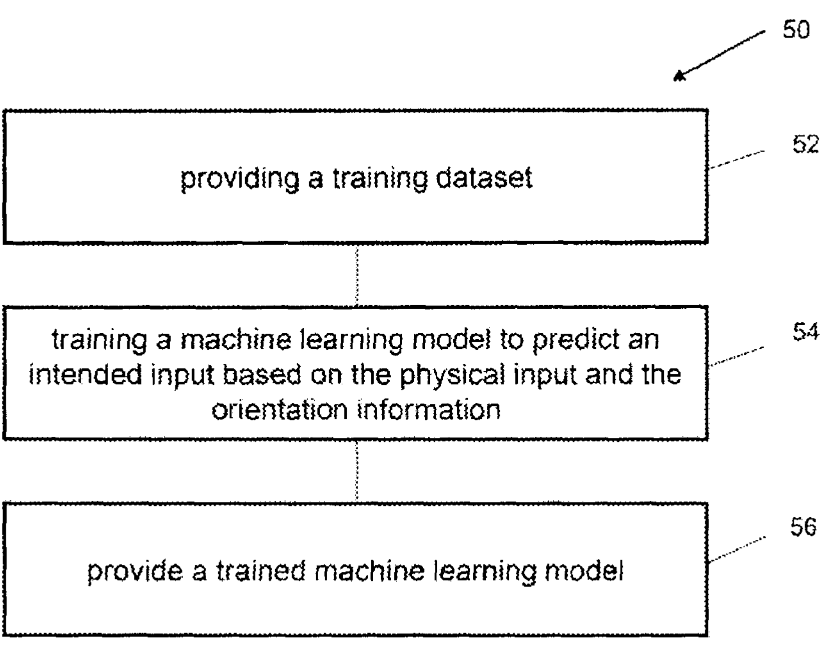
FIG. 5 shows a method of training a neural network model to correct a physical input.

A method of training a machine learning model is also provided by the disclosure. FIG. 5 sets out a method 50 for training a machine learning model to correct a physical input to an input device of a video game device.

In a first step 52, a dataset is provided. The dataset comprises a plurality of training instances, each training instance comprising an intended input, a physical input and orientation information of a video game controller. An example dataset is illustrated in FIG. 7.

The dataset may be constructed by displaying a prompt, for example to a test user, and receiving orientation information from the physical input device and a physical input. To be clear, the received orientation information is associated with the physical input. In this way, a specific kind of training dataset can be created to train the machine learning model. The input directions (both intended and physical), and the orientation information may be represented in any suitable format. For example, input directions may be represented by discrete labels such as left, right, down, upper left, lower right, or they may be represented by continuous values such as an angle between 0 to 360 degrees relative to a chosen direction (e.g., up). They may also be represented by a two or three dimensional direction vector relative to a chosen coordinate system. Equally, the orientation information may be represented by similar labels, values, or vectors. For example, orientation may be represented by pitch, yaw and roll. The coordinate system of such orientation vector may be chosen for convenience, for example the direction perpendicular to the plane of the controller may be chosen as the vector representing orientation of the controller. Typically, the orientation vectors may be relative to a determined equilibrium direction.

Returning to FIG. 5, in a step 54, the machine learning model is trained based on the plurality of training instances to predict the intended input based on the physical input and the orientation information. That is, for a known intended input, the orientation information and physical input are fed into the machine learning model to train the machine learning model. At step 56, a trained machine learning model is provided.

Methods of training machine learning models vary depending on the particular machine learning model used. For example, some training methods may be faster or produce a more accurate model.

In the example where the machine learning model is a neural network, the training may comprise performing a backpropagation method to learn values for each of the weights connecting nodes in adjacent layers. Backpropagation involves inputting the activations of the output layer to a softmax function to determine the likelihood that the physical input corresponds to a particular intended input.

In any case, training the machine learning model generates information associated with the trained model, such as the learned weights of a neural network. The information associated with the trained machine learning model can be stored on a video game device, or indeed on a remote server, and initialised to provide an implementation of the trained model on the video game device or remote server.

A standard trained machine learning model for correcting a physical input to an input device of a video game device is therefore provided on a video game device. However, to achieve further improvements to the user experience, the standard model may be tailored or fine-tuned according to user specific input. At a high level, the fine-tuning is performed by receiving user specific input via the input device, the user specific input including a physical input, orientation information and an intended input. To be clear, generally, the orientation information is associated with the physical input, and further could be the orientation that the controller was in at or around the time the physical input was generated or performed. The machine learning model is therefore fine-tuned by providing further training based on the user-specific input. After fine tuning, it is possible to revert back to the standard machine learning model if it is found that the tailored model is no longer accurate or otherwise causes problems.

There are multiple ways to perform fine-tuning, but each provides the overall benefit of providing the user with a tailored machine learning model that is adapted to their specific needs.

A first example of fine tuning is to note errors made by the user in normal use of the video game device and perform on-going fine tuning of the machine learning model. This involves the device detecting mistakes when they are made. This can be done by receiving the physical input, and then receiving a correction to the physical input a short time after, for example 0.5 seconds after the physical input. That is, the user has reacted to the erroneous physical input and manually corrected their erroneous physical input. The device is therefore able to know the intended input based on the manual correction.

For example, where the input device a controller and the physical input comprises moving a stick of the controller, the manual correction might be manifested as a rotational movement of the stick.

Another example of fine tuning is to perform a fine-tuning session by displaying a prompt to the user and receiving a physical input and orientation information in response to the prompt. For example, the prompt may instruct the user to move a stick of a controller in a particular direction. The prompt may also direct the user to hold the controller in a particular orientation to ensure that information is captured for a range of orientations. The device is therefore able to know the intended input based on the prompt displayed to the user.

Accordingly, after the machine learning model is trained, a further fine-tuning step may be performed to tailor the model to the user's requirements.

After fine-tuning has been performed, the updated information associated with the model can be stored on the video game device. If the machine learning model is stored on a remote server, an implementation of the fine-tuned model may be stored on the remote server. That is, updated information associated with the machine learning model may be stored.

The updated information associated with the machine learning model may also be stored in a user profile of the user, on the video game device and/or the remote server. This can allow multiple users of the video game device to have their own tailored model, or allow the users to access their tailored machine learning model from multiple video game devices via their user profile. Where multiple controllers are connected to one video game system, each user's profile may be stored together or on that system or on a cloud server. If the controller has storage capability, each profile may also be stored on the respective controller. Fine-tuned models specialised to each user may be temporarily or permanently stored on each controller.

For completeness, although the above example relates to an input device or controller of a video game device, the concept of corrected a physical input based on orientation information of the input device and a machine learning model is applicable generally to controllable devices. Below we provide a specific example in the context of a remote controlled vehicle and a medical device.

The controllable device may be a remote controlled vehicle, for example a toy remote control vehicle, or a full-size remote control vehicle that travels over land, over sea, under sea or through the air. For example the remote control vehicle may be a car, a lorry, a bus, a boat, a farm equipment, a submarine, a drone, a plane, a hovercraft or any other vehicle that can be controlled remotely. When a user is controlling a remote control vehicle using an input device the input device could be implemented as a controller, or a control station with controls corresponding to the vehicle, for example. A processor or processor sets may be included in the remote control vehicle, wherein the processor or processor sets are configured to receive a physical input from the input device; receiving orientation information from a gyroscope of the input device; provide the physical input and orientation information to a trained machine learning model, wherein the trained machine learning model is configured to output a corrected input based on the physical input and the orientation information; and receive from the trained machine learning model, a corrected input corresponding to the physical input and receive from the trained machine learning model, a corrected input corresponding to the physical input. It will be appreciated that advantages mentioned above in respect to the video game device apply equally to correcting and input to a remote controlled vehicle. Further, it is especially advantageous to correct an input to a remote control vehicle due to the damage to the remote control vehicle and its surroundings that can be caused by loss of control of the vehicle, which could occur due a mistake when handling the input device.

The remote control vehicle typically includes suitable circuitry and memory to perform the method of correcting a physical input, and components to enable communication with the input device and also with a remote server, in cases where the machine learning model is stored remotely.

In another example, the controllable device may be a medical device such as a surgical tool or a robot configured to perform a surgical procedure. The tool or robot are controlled using an input device such as a controller or a control station. The medical device is equipped with processor or processor sets configured to receive a physical input from the input device; receiving orientation information from a gyroscope of the input device; provide the physical input and orientation information to a trained machine learning model, wherein the trained machine learning model is configured to output a corrected input based on the physical input and the orientation information; and receive from the trained machine learning model, a corrected input corresponding to the physical input and receive from the trained machine learning model, a corrected input corresponding to the physical input. It will be appreciated that advantages mentioned above in respect to the video game device apply equally to correcting and input to a medical device. Further, surgery, by its nature exposes a patient to risk or injury or death, and so it is especially important that patient safety is maintained as surgical technology advances. The method of the disclosure improves patient safety by reducing or avoiding errors that occur due to mistaken input to an input device.

The medical device typically includes suitable circuitry and memory to perform the method of correcting a physical input, and components to enable communication with the input device and also with a remote server, in cases where the machine learning model is stored remotely.

In summary, methods provided herein allow for orientation aware correction of a physical input using a trained machine learning model to correct the physical input. This unlocks a greater degree of freedom for the user to use a controllable device in a variety of positions while also keeping the input device in a comfortable orientation. The user would no longer worry that their use experience will be negatively affected because of mistakes that occur, for example, when they are lying down and they hold the controller upside down.

Figure 6:
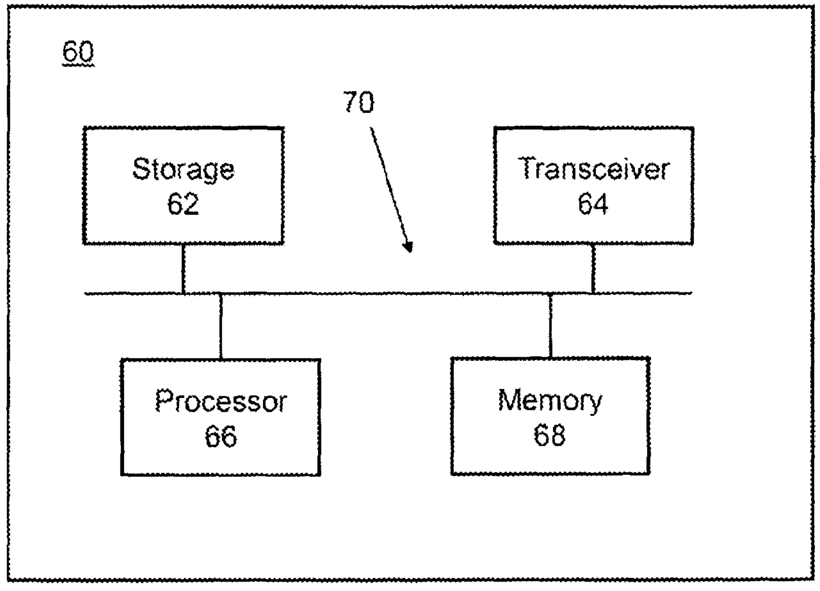
FIG. 6 shows an example video gaming system.

FIG. 6 illustrates a schematic of a video game device 60. The video game device 60 comprises storage 62, transceiver 64, processor 66 and memory 68. The video game device 60 may include various other modules and sensors not shown. The components of the video game device 60 are typically connected by a bus 70 to facilitate communication between components.

The storage 62 may be a storage module suitable for storing information associated with the machine learning model discussed above. For example, in examples where the machine learning model is a neural network, the learned weights of the neural network may be stored in storage module 62. The storage module 62 is intended to mean non-volatile storage.

Transceiver 64 is configured to receive signals from and transmit signals to an input device, as well as external other components connected to the video game device, such as a display.

Processor 66 can be configured to execute instructions which cause the processor to perform any of the methods discussed above. The processor 66 could be implemented as a single processor chip or a set of processor chips including a digital signal processor and a neural network processor. The processor 66 may be configured to implement the machine learning model if the storage module 62 stores the corresponding information associated with the machine learning model.

Memory 68 refers to storage which may be volatile storage, such as RAM.

The methods and processes described above can be implemented as code (e.g., software code).

For completeness, such code can be stored on one or more computer-readable media, which may include any device or medium that can store code and/or data for use by a computer system. When a computer system reads and executes the code stored on a computer-readable medium, the computer system performs the methods and processes embodied as code stored within the computer-readable storage medium. In certain embodiments, one or more of the steps of the methods and processes described herein can be performed by a processor (e.g., a processor of a controllable device, a video game device or remote server).

The invention claimed is:

1. A computer-implemented method of correcting a physical input to an input device of a controllable device, the method comprising:

receiving a physical input from the input device at a first time, the physical input indicating a physical input direction of a movable member that is movably attached to the input device and generated in response to a movement of the movable member in the physical input direction relative to the input device;

receiving orientation information from a gyroscope of the input device, the orientation information defining an orientation of the input device at the first time;

providing the physical input and orientation information to a trained machine learning model, wherein the trained machine learning model is configured to output a corrected input based on the physical input indicating a direction of the movable member and the orientation information defining the orientation of the input device, the corrected input being a prediction of an intended input that is different from the physical input and that indicates a movement of the movable member in an intended input direction relative to the input device and that is different from the physical input direction relative to the input device; and receiving from the trained machine learning model, the corrected input corresponding to the physical input.

2. The method according to claim 1, wherein the trained machine learning model is stored on the controllable device.

3. The method according to claim 1, wherein the trained machine learning model is stored on a remote server in communication with the controllable device.

4. The method according to claim 1, wherein:

the input device is a video game device controller; and the physical input comprises moving a stick of the video game device controller in the physical input direction relative to the input device.

5. The method according to claim 1, further comprising:

detecting that the physical input requires correction; and providing the physical input and orientation information to the trained machine learning model in response to detecting that the physical input requires correction.

6. The method according to claim 1, wherein:

the trained machine learning model is a trained neural network; and the physical input and orientation information is provided as input to an input layer of the trained neural network.

7. The method according to claim 1, wherein the controllable device comprises one of a video game device, a remote-controlled vehicle, or a medical device.

8. A computer-readable storage medium comprising instructions, which, when executed by a processor of a controllable device, cause the controllable device to perform operations comprising:

receiving a physical input from an input device of the controllable device at a first time, the physical input indicating a physical input direction of a movable member that is movably attached to the input device and generated in response to a movement of the movable member in the physical input direction relative to the input device;

receiving orientation information from a gyroscope of the input device, the orientation information defining an orientation of the input device at the first time;

providing the physical input and orientation information to a trained machine learning model, wherein the trained machine learning model is configured to output a corrected input based on the physical input indicating a direction of the movable member and the orientation information defining the orientation of the input device, the corrected input being a prediction of an intended input that is different from the physical input and that indicates a movement of the movable member in an intended input direction relative to the input device and that is different from the physical input direction relative to the input device; and receiving from the trained machine learning model, the corrected input corresponding to the physical input.

9. A system comprising one or more processors configured to perform the operations comprising:

receiving a physical input from an input device of a controllable device at a first time, the physical input indicating a physical input direction of a movable member that is movably attached to the input device and generated in response to a movement of the movable member in the physical input direction relative to the input device;

receiving orientation information from a gyroscope of the input device, the orientation information defining an orientation of the input device at the first time;

providing the physical input and orientation information to a trained machine learning model, wherein the trained machine learning model is configured to output a corrected input based on the physical input indicating a direction of the movable member and the orientation information defining the orientation of the input device, the corrected input being a prediction of an intended input that is different from the physical input and that indicates a movement of the movable member in an intended input direction relative to the input device and that is different from the physical input direction relative to the input device; and receiving from the trained machine learning model, the corrected input corresponding to the physical input.

10. A computer-implemented method of training a machine learning model to correct a physical input to an input device of a controllable device, the method comprising:

providing a training dataset comprising a plurality of training instances for an input device that includes a movable member that is movably attached to the input device, each training instance comprising:

an intended input of the movable member in an intended input direction relative to input device at a particular time and indicating an intended movement of movable member relative to the input device;

a physical input of the input device at the particular time and indicating a physical movement of movable member relative to the input device; and orientation information of the input device at the particular time defining an orientation of the input device at the particular time; and training the machine learning model based on the plurality of training instances to predict the intended input at the particular time based on the physical input and the orientation information to provide a trained machine learning model.

11. The method according to claim 10, further comprising:

storing information associated with the trained machine learning model on the controllable device; and initializing an implementation of the trained machine learning model on the controllable device.

12. The method according to claim 11, wherein:

the machine learning model is a neural network; and the information associated with the trained machine learning model is a value for each of the weights that connect nodes in adjacent layers of the neural network.

13. The method according to claim 11, further comprising:

receiving data specific to a user of the controllable device via the input device, wherein the data comprises a physical input from the input device, orientation information of the input device, and an intended input to the input device; and updating the information associated with the trained machine learning model based on the received data;

wherein the intended input to the input device is derived based on a manual correction of the physical input.

14. The method according to claim 13, wherein:

the input device is a video game controller;

the manual correction comprises a rotational movement of a stick provided on the video game controller; and the intended input to the input device is derived based on a prompt displayed to the user.

15. The method according to claim 13, wherein the updated information associated with the trained machine learning model is stored in a user profile of the user.

16. The method according to claim 15, wherein the user profile is stored on the controllable input device.

17. The method according to claim 15, wherein the user profile is stored on a remote server.

18. The method according claim 10, wherein providing the training dataset comprises displaying a prompt, wherein the prompt is the intended input, and in response to the prompt:

receiving an orientation information of the input device from the input device; and receiving a physical input from the input device.

19. The method according to claim 10, wherein:

the input device is a video game controller; and the physical input comprises moving a stick of the video game device controller.

20. The method according to claim 10, wherein the controllable device comprises one of a video game device, a remote-controlled vehicle, or a medical device.

* * * * *